(12) United States Patent
Vance

(10) Patent No.: US 7,177,957 B2
(45) Date of Patent: Feb. 13, 2007

(54) SYSTEM AND METHOD FOR CONFIGURING INFORMATION HANDLING SYSTEM NETWORKED PERIPHERALS

(75) Inventor: Jonathan Vance, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 432 days.

(21) Appl. No.: 10/798,047

(22) Filed: Mar. 11, 2004

(65) Prior Publication Data

US 2005/0204071 A1   Sep. 15, 2005

(51) Int. Cl.
G06F 3/00    (2006.01)
G06F 15/177  (2006.01)

(52) U.S. Cl. .................. 710/13; 709/220; 717/174

(58) Field of Classification Search ........ 709/220–226; 710/8–13; 717/168–178
See application file for complete search history.

(56) References Cited

U.S. PATENT DOCUMENTS 6,286,038 B1 * 9/2001 Reichmeyer et al. ....... 709/220
2003/0110926 A1   6/2003 Sitrick et al. ................ 84/477
2003/0131136 A1   7/2003 Emerson et al. ............ 709/250
2003/0217126 A1  11/2003 Polcha et al. ............... 709/220
2004/0039821 A1 * 2/2004 Giglio et al. ................ 709/227
2004/0215969 A1 * 10/2004 Nance et al. ................ 713/191
2005/0149626 A1 * 7/2005 Manchester et al. ........ 709/220
2005/0198221 A1 * 9/2005 Manchester et al. ........ 709/220
2005/0198233 A1 * 9/2005 Manchester et al. ........ 709/221

* cited by examiner

Primary Examiner—Christopher Shin
(74) Attorney, Agent, or Firm—Hamilton & Terrile, LLP; Robert W. Holland

(57) ABSTRACT

Information handling system peripherals, such as printers, scanners, routers, switches, are configured to communicate over a local area network with network configuration information stored on a portable flash memory device, such as a USB storage device. A network configuration utility associated with the peripheral applies selected network configuration information to the peripheral, such as a static IP address, a subnet mask and a gateway, and disables dynamic networking functions, such as DHCP, BOOTP and RARP to stabilize the peripheral configuration for communication over the local area network.

20 Claims, 2 Drawing Sheets

SYSTEM AND METHOD FOR CONFIGURING INFORMATION HANDLING SYSTEM NETWORKED PERIPHERALS

BACKGROUND OF THE INVENTION

1. Field of the Invention

The present invention relates in general to the field of information handling system peripherals, and more particularly to a system and method for configuring information handling system networked peripherals, such as printers interfaced with a local area network.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with a number of peripherals to communicate, print or otherwise process information, such as printers, scanners, switches and routers. Often these peripherals are interfaced over local area networks so that, for instance, multiple information handling systems can use the same peripheral, such as to print information. Typically information handling system peripherals are networked with dynamic configuration information using standardized dynamic configuration functions. One example of a dynamic configuration function commonly used for newly interfaced peripherals is the use of dynamic Internet Protocol (IP) addresses provided by the Dynamic Host Configuration Protocol (DHCP). Other dynamic configuration functions used to establish a network interface with a peripheral include Bootstrap Protocol (BOOTP) and Reverse Address Resolution Protocol (RARP).

Although dynamic configuration protocols are generally available for interfacing peripherals to a local area network, in some instances dynamic configurations are either unavailable or undesirable. When dynamic configuration is unavailable, configuration of the peripheral generally involves interaction by a user with a TCP/IP setup utility accessed through a physically interfaced information handling system. This utility typically requires the user to enter the canonical or MAC address of the peripheral, an error prone process given the complexity of the address and the non-intuitive nature of the setup utility. After entry of the information, network communication with the peripheral is typically established by using a temporary IP address generated through an incremental increase of the system running the setup utility until an unused IP address is found. The finding of an unused IP address may be a time consuming process where a number of incremental increases are needed. When a dynamic configuration is available but undesired, a user typically must interface with an operations panel of the peripheral, either directly or through a network, to reset the peripheral to a static IP address. For instance, dynamic IP addresses use IP leasing and are subject to change without warning, often an unacceptable solution in large local area networks. Establishing a static IP address through the network generally involves technically complex interactions through the network server to an embedded server of the peripheral with a dynamic IP address in order to establish a static IP address. Direct interaction with the peripheral operations panel is often confusing since peripheral interfaces tend to be uninformative and non-intuitive. In either case, the dynamic configuration functions of the peripheral typically must be manually disabled to prevent inadvertent alteration of the static configuration information.

SUMMARY OF THE INVENTION

Therefore a need has arisen for a system and method which reduces the complexity of configuring networked peripherals.

In accordance with the present invention, a system and method are provided which substantially reduce the disadvantages and problems associated with previous methods and systems for configuring networked peripherals. Peripheral network configuration information stored on a portable flash memory device that is interfaced with a peripheral communication port downloads to the peripheral to configure the peripheral with a static network address.

More specifically, a peripheral configuration application running on an information handling system accepts network configuration information for one or more printers, such as static IP address, subnet mask and gateway information, and store the network configuration information on a USB storage device interfaced with the information handling system USB port. The USB storage device is transported to a networked printer and interfaced with a USB port of the printer to make the stored network configuration information readable by a network configuration utility of the printer. An operations panel of the printer supports selection of network configuration information associated with the printer from among plural stored configurations. Upon selection of the desired configuration, the network configuration utility applies the configuration information to the printer hardware, firmware or software to enable communication over the local area network with the configuration information. The network configuration utility also automatically disables dynamic addressing functions, such as DHCP, BOOTP and RARP, so that the static network configuration is not inadvertently changed.

The present invention provides a number of important technical advantages. One example of an important technical advantage is that the time and complexity associated with network configuration of information handling system peripherals is reduced. The USB storage device is generally supported by existing peripheral functionality so that the network configuration utility interfaces with existing communications systems. A portable USB storage device may store a series of configurations to allow a network administrator to input configuration information for plural peripherals in one session at the peripheral configuration application and then configure the plural peripherals by transporting the USB storage device to each. Automated disabling of the peripheral dynamic configuration functions reduces the complexity of the configuration process and precludes inadvertent changes to the network configuration.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system peripherals interface with a local area network by application of network configuration information provided from a portable flash memory device, such as a USB storage device. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
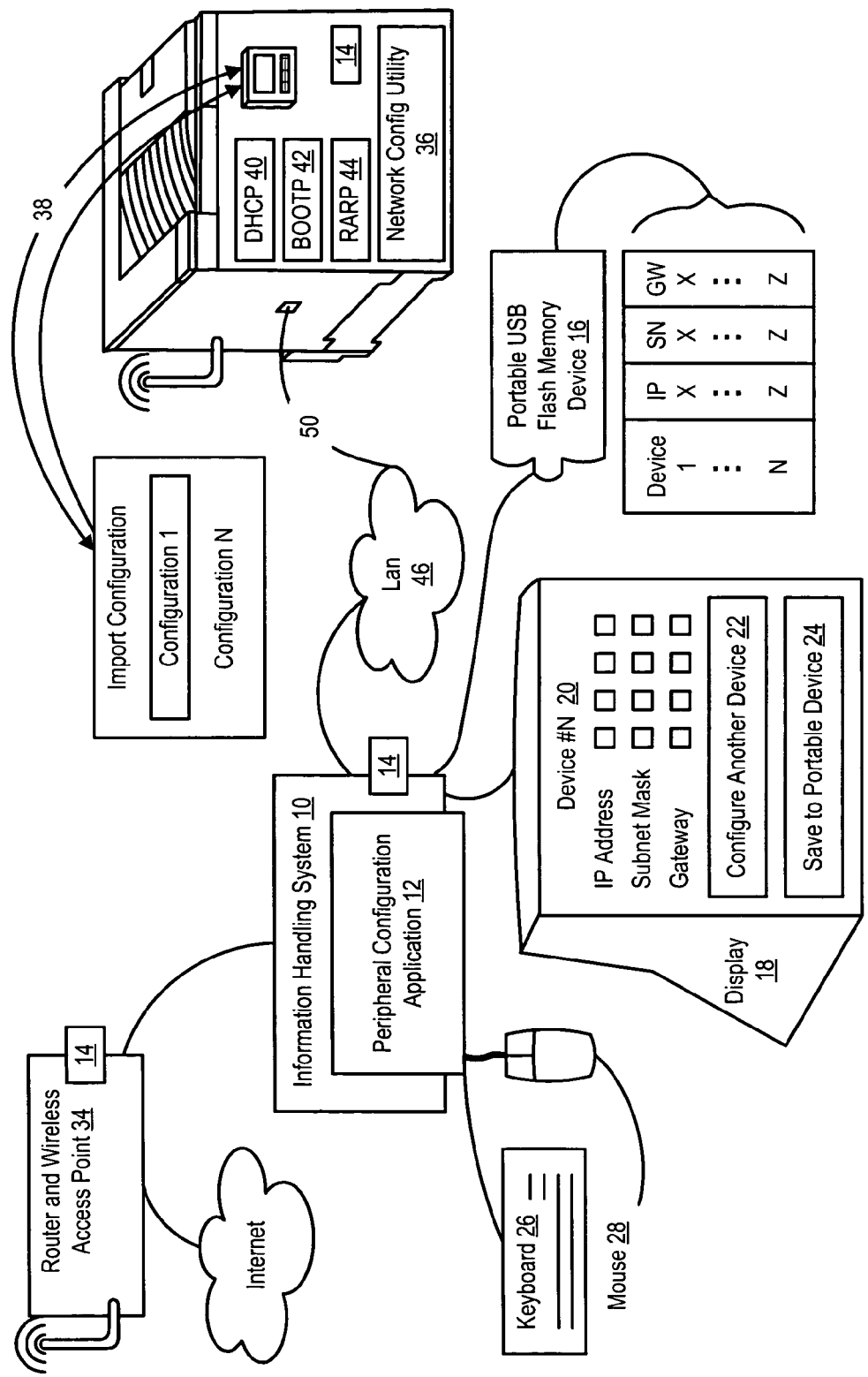
FIG. 1 depicts a block diagram of a local area network having peripherals configured with a portable flash memory device.

Referring now to FIG. 1, a block diagram depicts a local area network having peripherals configured with a portable flash memory device. An information handling system 10 runs a peripheral configuration application 12 that interfaces through a USB port 14 to a portable USB flash memory device 16. Peripheral configuration application 12 presents to user through a display 18 a peripheral network configuration graphical user interface 20. Peripheral network configuration graphical user interface 20 accepts user inputs through a keyboard 26 and mouse 28 of a static IP address, a subnet mask and a gateway for a peripheral device chosen by a selection button 22, and directs peripheral configuration application 12 to save the peripheral network configuration information with a save button 24. Portable USB flash memory device 16 inserts into USB port 14 of information handling system 10 to accept the network configuration in a table 30. Portable USB flash memory device 16 is, for instance, an EEPROM storage device that maintains table 30 in memory after removal from USB port 14 without the application of power.

Once the peripheral network configuration information is stored, portable USB flash memory device 16 interfaces with a USB communication port 14 of a peripheral, such as printer/scanner 32 or router and wireless access point 34, to transfer the network configuration information to the peripheral. Using printer 32 as an example, a network configuration utility 36 reads table 30 and presents the device information to an operator panel or other peripheral user interface 38 for a user to select an appropriate device or confirm an automatic selection by utility 36. Network configuration utility 36 applies the selected network configuration to the hardware and software components of printer 32 that interface with a local area network 46, either through a wireless interface 48 or a hardwired interface 50, such as Ethernet. Network configuration utility 36 also disables dynamic networking functions, such as DHCP 40, BOOTP 42 and RARP 44, so that the network configuration information remains stable and is not inadvertently altered. Advantageously, table 30 may include network configuration information for plural peripherals to allow a network administrator to carry portable USB flash memory device 16 between multiple devices with one use of interface 20.

Figure 2:
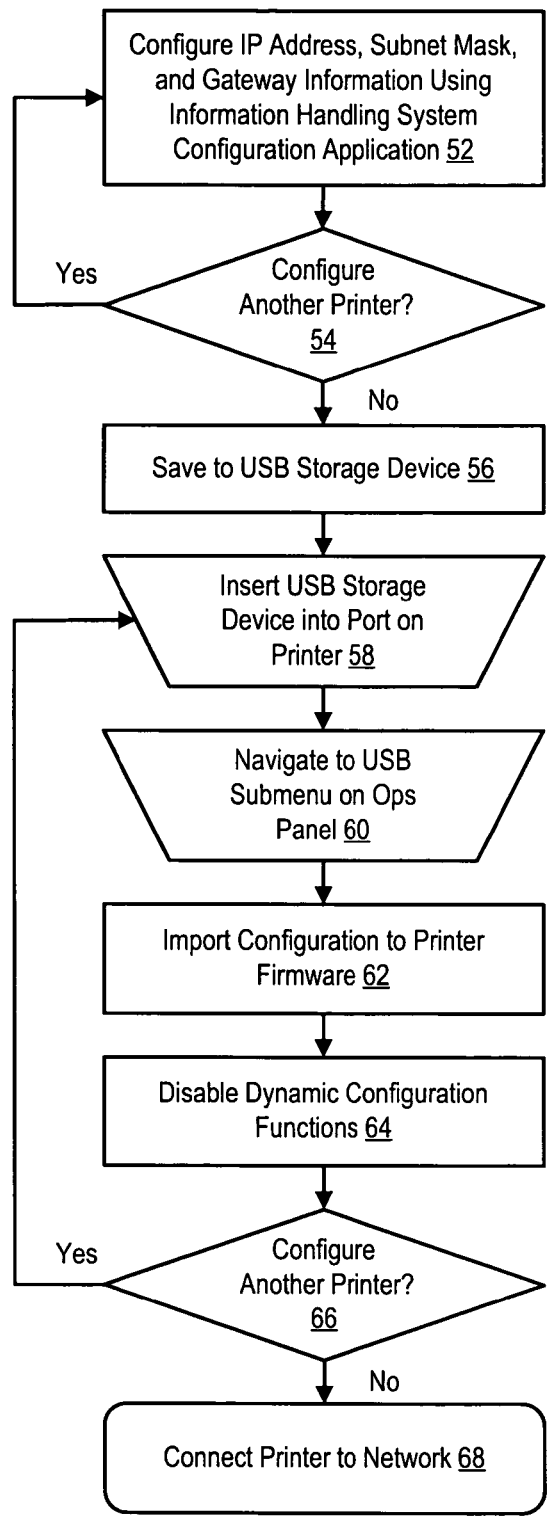
FIG. 2 depicts a flow diagram of a process for configuring local area network peripherals with a portable flash memory device.

Referring now to FIG. 2, a flow diagram depicts a process for configuring local area network peripherals, such as printers, with a portable flash memory device. The process begins at step 52 with the input of printer network configuration information, such static IP address, subnet mask and gateway information, at an information handling system configuration application for storage to a portable flash memory device. At step 54 a determination is made of whether to configure another printer and, if so, the process returns to step 52. Once all peripheral network configuration information is input to the information handling system, the process continues to step 56 for storage of the information on the portable flash memory device. At step 58, the portable USB storage device is inserted into a USB port of a selected printer. At step 60, the operations panel of the printer is used to navigate to a USB submenu so that, at step 62 the network configuration information for the printer is selected and imported into the printer firmware. At step 64, the dynamic configuration functions of the printer are automatically disabled, such as the DHCP, BOOTP and RARP functions. At step 66, a determination is made whether to configure an additional printer by returning to step 58. If no additional printers are configured, the process continues to step 68 to interface the printer with the network using the applied network configuration information.

Although the present invention has been described in detail, it should be understood that various changes, substitutions and alterations can be made hereto without departing from the spirit and scope of the invention as defined by the appended claims.

What is claimed is:

1. A system for configuring networked peripherals, the system comprising:
    a portable flash memory device operable to interface with an information handling system communication port;
    a peripheral configuration application running on an information handling system having a communication port, the peripheral configuration application operable to accept network configuration information for one or more peripherals and to store the network configuration information on the portable flash memory device;
    a communication port associated with the peripheral and operable to interface with the portable flash memory device; and
    a network configuration utility running on the peripheral, the network configuration utility operable to read the network configuration information from the portable flash memory device and apply the network configuration information to the peripheral.

2. The system of claim 1 wherein the network configuration information comprises a static IP address associated with the peripheral.

3. The system of claim 2 wherein the network configuration information further comprises one or more of a subnet mask and a gateway.

4. The system of claim 2 wherein the network configuration utility is further operable to disable one or more dynamic IP address functions of the peripheral.

5. The system of claim 4 wherein the dynamic IP address functions comprise one or more of DHCP, BOOTP or RARP.

6. The system of claim 2 wherein the portable flash memory device comprises a USB storage device and the communication port comprises a USB port.

7. The system of claim 6 wherein the peripheral comprises a printer.

8. The system of claim 6 wherein the peripheral comprises a scanner.

9. The system of claim 6 wherein the peripheral comprises a router.

10. The system of claim 6 wherein the peripheral comprises a switch.

11. A method for configuring networked peripherals, the method comprising:
inputting into an information handling system network configuration information for a peripheral to communicate with a local area network;
storing the inputted network configuration information on a portable flash memory device interfaced with a communication port of the information handling system;
interfacing the portable flash memory device with a communication port of the peripheral;
transferring the network configuration information to the peripheral; and
applying the network configuration information to configure the peripheral to interface with the local area network.

12. The method of claim 11 further comprising:
disabling one or more dynamic network configuration functions of the peripheral.

13. The method of claim 12 wherein the dynamic network configuration functions of the peripheral comprise one or more of DHCP, BOOTP or RARP.

14. The method of claim 12 wherein the network configuration information comprises one or more of a static IP address, a subnet mask or a gateway.

15. The method of claim 14 wherein the peripheral comprises a printer.

16. The method of claim 15 wherein the portable flash storage devices comprises a USB storage device and the communication port comprises a USB port.

17. The method of claim 11 further comprising:
inputting into the information handling system network configuration information for plural peripherals;
storing the networking configuration information for the plural peripherals in the portable flash memory device; and
selecting network configuration information associated with a peripheral for transferring and applying to the peripheral.

18. An information handling system printer comprising:
components operable to process information received from an local area network with a dynamic network configuration and to print the information;
a communication port operable to interface with a portable flash memory device;
a network configuration utility interfaced with the communication port to read network configuration information stored on the portable flash memory device, the network configuration utility operable to apply the network configuration information to the components to interface with the local area network and to disable the dynamic network configuration.

19. The system of claim 18 wherein the communication port further comprises a USB port operable to interface with a USB portable flash memory device.

20. The system of claim 19 wherein:
the network configuration comprises one or more of a static IP address, a subnet mask and a gateway; and
the dynamic network configuration comprises one or more of DHCP, BOOTP and RARP.

* * * * *